(No Model.) 2 Sheets—Sheet 2.
W. J. BAILEY.
MEANS FOR AND METHOD OF FILTERING OIL.
No. 531,713. Patented Jan. 1, 1895.
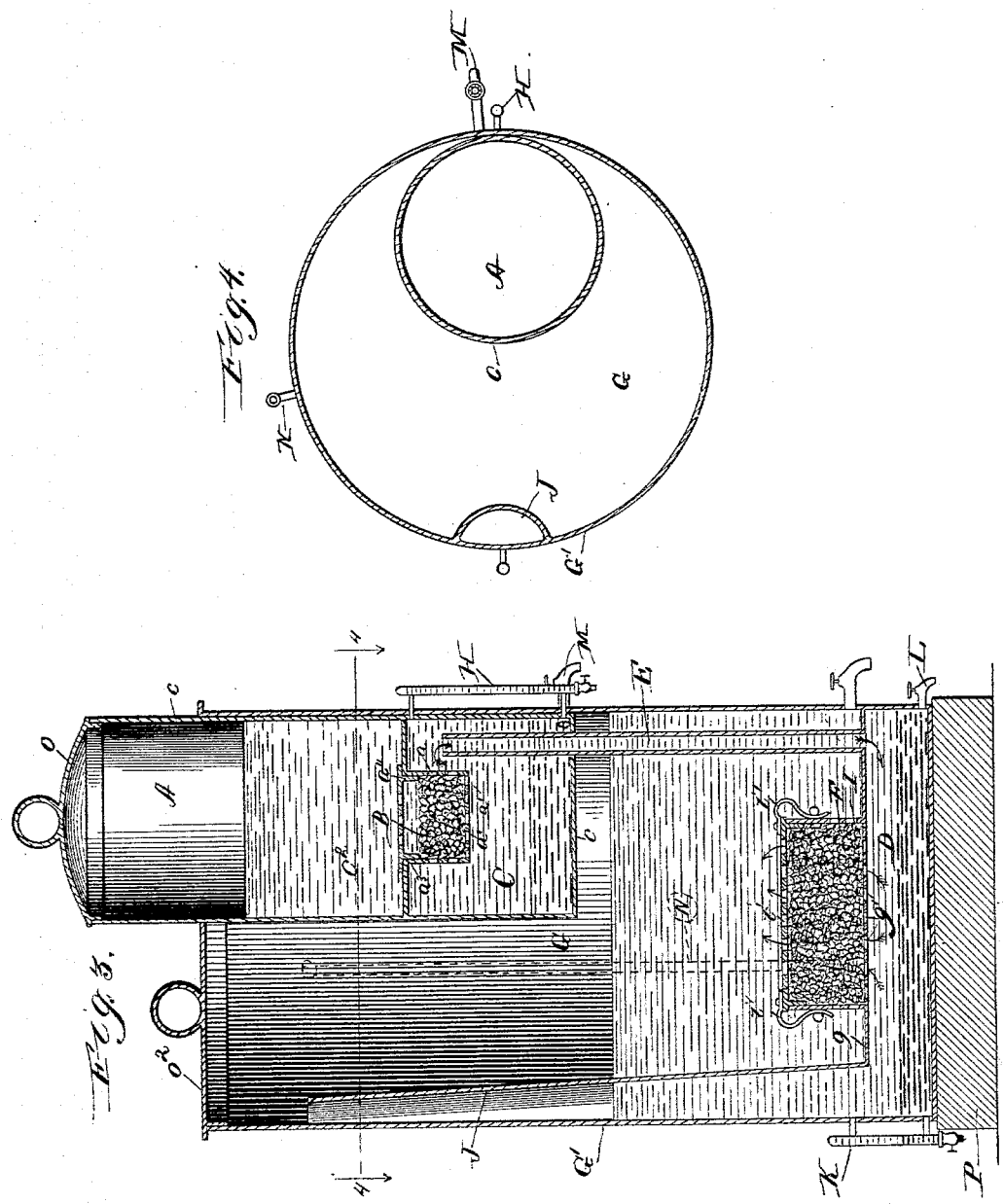

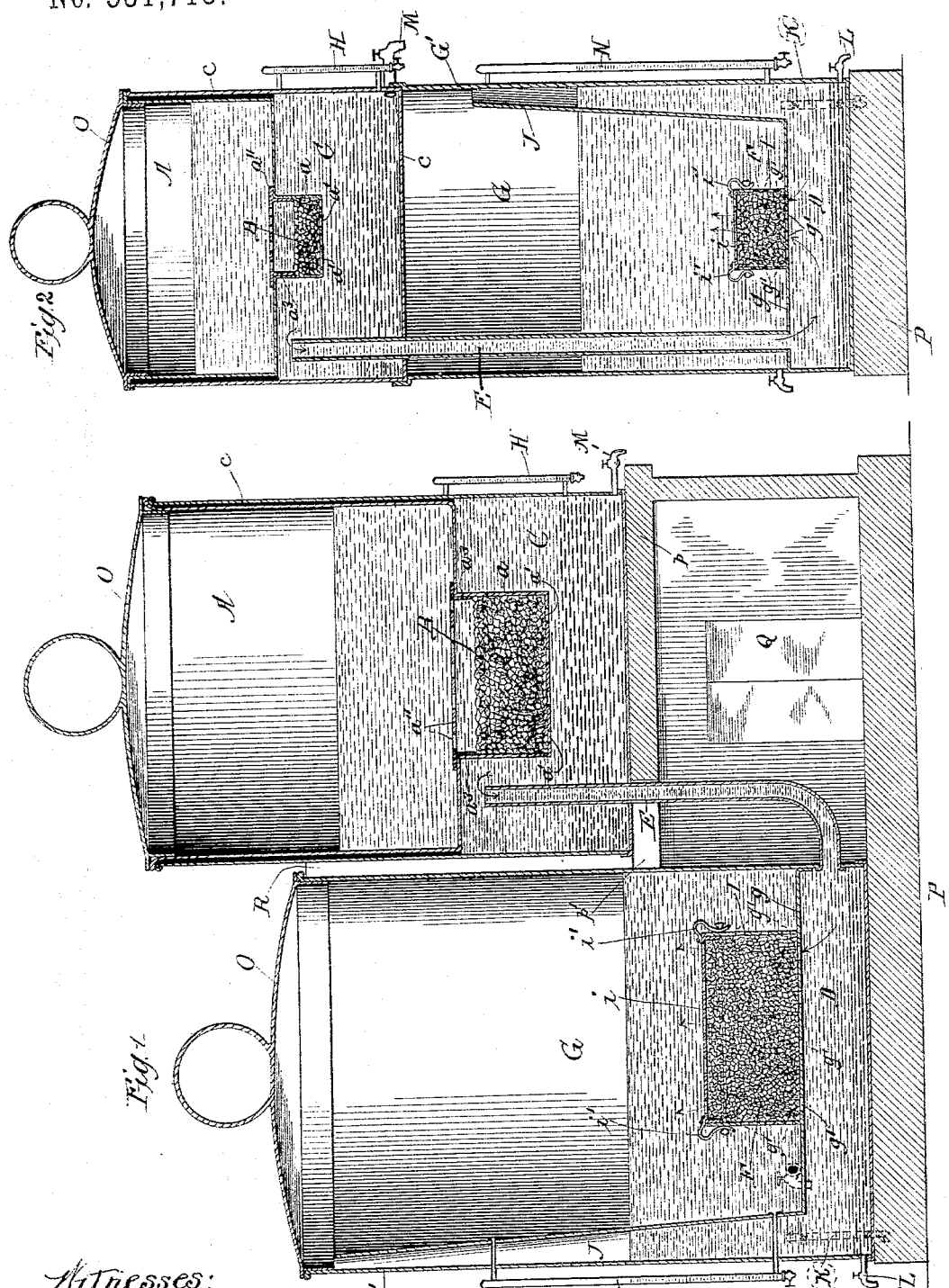

UNITED STATES PATENT OFFICE.

WILLIAM J. BAILEY, OF EVANSVILLE, INDIANA.

MEANS FOR AND METHOD OF FILTERING OIL.

SPECIFICATION forming part of Letters Patent No. 531,713, dated January 1, 1895.

Application filed December 12, 1892. Serial No. 454,811. (No model.)

*To all whom it may concern:*

Be it known that I, WILLIAM J. BAILEY, a citizen of the United States, residing at Evansville, in the county of Vanderburg and State of Indiana, have invented certain new and useful Improvements in Oil-Filters, of which the following is a full, clear, and exact specification.

My invention has reference to an improved filter for effectually removing from crude and other oils, not only dirt and solid particles of foreign matter, but also the water of which a large percentage is usually held in suspension in the oil.
It is of course, well known, that sufficient difference exists between the specific gravity of oil and water to cause the two to readily separate, but while the oil contains particles of solid or semi-solid matter, it holds considerable water in suspension by reason of the fact that such particles soak up the water and retain it. Hence, it is apparent, that to rid the oil of the water, it is first necessary to remove the solid matter which constitutes a vehicle for the water, and which, when removed, permits the water to gravitate to the bottom; but in the process of this initial filtering the water and the oil necessarily descend into the same receptacle, and consequently, the water in descending to its proper level passes entirely through the superstratum of oil. This continual agitation or commingling of the two impregnates the oil to a greater or less degree with very small particles or globules of the water, producing what is known in the art, as damp oil; and hence, to obtain the oil entirely free from water, it becomes necessary to again filter it in an upward direction, the principle of which operation being, that the globules of water while they are sufficiently light to remain in suspension in the oil for a considerable length of time, will, by reason of their greater specific gravity, not have sufficient ascendency power to overcome the resistance offered by the filtrant, but will collect therein and finally sink in the oil which having greater buoyancy than the water will rise and percolate through the filtrant, while the resistance to the upward course of the water offered by the filtrant when added to the natural tendency of the water to gravitate in the body of oil, prevents it from following the current of oil in its upward course through the filtrant, and causes it to collect at the under side of the filtrant until its natural tendency to gravitate causes it to sink to the bottom.

The object of my invention is therefore, to provide improved means for first separating the oil and whatever water there may be present therein from the dirt and solid matter commingled therewith, and subsequently filtering the resultant liquid in an upward direction.

With these ends in view my invention consists in certain features of novelty described herein, pointed out in the claims and shown in the accompanying drawings which represent my improved form of apparatus, and in which drawings—

Figure 1, is a vertical longitudinal section of the preferred form, and Fig. 2 is a similar view of a modified form of the improved apparatus. Fig. 3, is a similar view of a further modification, and Fig. 4, is a plan section taken on the line 4—4, Fig. 3.

Like signs of reference indicate like parts in all the views.

In carrying out my invention the oil from which the water and particles of foreign matter are to be removed, is placed in an elevated tank or filter, through the filtrant of which the solution percolates into a subchamber or second tank, while in this latter chamber the major part of the water separates from the oil by virtue of its natural tendency to sink therein, and hence, the upper stratum of oil may be run off into a lower receptacle whence it is allowed to percolate upward through a super-posed filter into a third tank or receptacle from which the oil thus refined may be drawn for use, the separated water remaining in the bottom of the tanks being drawn off as it accumulates, through suitably arranged cocks.

In the drawings, A is the elevated tank, having a suitable filtrant B arranged at the bottom thereof, and which elements constitute the said elevated filter.

C is the sub-chamber or second tank.

D is the lower chamber into which the oil from the chamber C is delivered by a pipe E, and F is the super-posed filter through which the oil passes into the upper tank G from which it may be drawn for use.

The tank C, is preferably supported in any convenient and well known manner, in the upper end of a tank c, and, extending to within a suitable distance from the bottom of the tank c, forms the sub-chamber C which collects the oil and water coming from the filtrant B. The bottom of the chamber A may be provided with a depending cup a, having suitable perforations $a'$, for the passage of the oil and water, and into which cup or box a is placed a filtrant B, consisting of charred bone pulverized with silk, cheese cloth and wool as this mixture is found to be a very efficient filtrant and has a further advantage over oil filtrants heretofore used, in that it does not discolor the oil.

The top of the filtrant cup or box a, if desired, may be covered by a suitable cap $a''$, provided with suitable perforations and having a depending flange $a^3$ fittting into the box or cup a.

The passage of the oil and water through the filtrant B results in the separation therefrom of the particles of solid matter which remain behind in the filtrant box, and may, from time to time, be removed therefrom. The resultant liquid falls into the sub-chamber C and the oil and water in greater part separate, the oil of course, rising to the top; but since all of the water which comes down from the upper chamber A necessarily passes through the super-stratum of oil in the chamber C, such oil becomes more or less impregnated with the water; and to the end that it may be drawn off from the chamber C, and again filtered as described, I connect the upper part of such chamber C with the chamber D by means of the pipe E, which is preferably in the form of a stand-pipe arranged with its upper end above the bottom of the filtrant chamber a, thus insuring the free escape of the oil and guarding against the escape of the water in the bottom of the chamber C into the chamber D along with the oil.

The tanks D and G are preferably formed by providing the main tank or shell $G'$ with a false bottom g, which is perforated as shown at $g'$ throughout a suitable area and over which perforations is suitably secured a perforated filtrant box I, having a removable cover i, held in place by suitable spring latches $i'$, and in which box the filtrant F is located.

The chambers D and G are connected together by an upright pipe or passage J whereby the air may escape from the chamber G into the chamber D, and thus equalize the pressure above and below the filtrant F. The chamber D may be provided with a suitable gage K to indicate the level of the water therein and the water collecting in such chamber and the chamber C may be drawn off when necessary through suitably arranged cocks L, M respectively. The level of the refined oil in the chamber G may be indicated, if desired, by suitable gage N. The tanks A and $G'$ may be provided with suitable covers O. In this form of my apparatus the tanks c and $G'$ are arranged side by side, the latter a little below the former, and they are preferably supported upon a pedestal or stand P which is provided with a step p upon which the tank C rests, such step being preferably made hollow and provided with doors Q, whereby the interior of the step may be utilized as a locker or closet. The tanks c and $G'$ are preferably connected together by web R, and the top of the step p is provided with a slot $p'$ for the passage of the pipe E when moving the tanks into place on the pedestal.

In the modification shown in Fig. 2, the tanks c and $G'$ are arranged one above the other, the tank c being preferably supported in and closing the upper end of the tank $G'$, while the pipe E is carried downward from the bottom of the tank c to the false bottom g of the tank $G'$, it being preferably arranged within the chamber G as shown.

In some instances, it may be desirable that the construction should be such as to permit of access to the tank G through its upper end without necessitating the removal of the tank c arranged therein. In this event, the construction shown in Figs. 3 and 4 may be employed. In this form, the tank c is of much less diameter than the tank G and it is permanently secured in the upper end thereof, and if desired may project slightly above the top of the tank G for the sake of greater capacity. By such an arrangement it will be seen that one side of the upper end of the tank G is left open, and access thereto may be had by removing the crescent shaped cover $O^2$.

The chambers A and C in the tank c may be formed by providing such tank with a partition or bottom $c^2$ permanently arranged therein and supporting the filtrant B by means similar to that already described, thus forming the two chambers A—C by means of a single tank.

The apparatus when constructed as last described may be preferable to the other forms in some instances for the further reason that it is much more compact and the parts being secured together in the form of a single device is more rigid and less liable to be rendered inoperative or defective by the displacement of its parts.

Having thus described my invention, what I claim as new therein, and desire to secure by Letters Patent, is—

1. The combination of a filter having a sub-chamber, a second chamber with which the upper part of said first chamber is directly connected, a third chamber located above said second chamber, an air vent leading from the second chamber upward into the third chamber and a filtrant interposed between said second and third chambers, substantially as set forth.

2. The combination of the tank c, the chamber A fitting in the upper end of said tank and having a perforated filtrant cup or box *a* depending from the bottom thereof, the removable perforated cap fitting in said cup or box, the tank G arranged below the tank *c* and having a false bottom provided with openings, a perforated filtrant box arranged on said bottom over said openings therein, the air vent J and a stand pipe extending upward in said tank *c*, and communicating with the tank G' below said false bottom, substantially as set forth.

3. The combination with the chamber for the reception of the crude oil, and a second chamber for the filtered oil, of a filtrant interposed between said chambers and being composed of charred bone, pulverized with silk, cheese cloth and wool, substantially as set forth.

WILLIAM J. BAILEY.

Witnesses:
FRO BAKER,
JAMES T. WALKER.